United States Patent [19]
Joseph

[11] Patent Number: 5,493,820
[45] Date of Patent: Feb. 27, 1996

[54] FIRE PREVENTING DUCT SYSTEM

[76] Inventor: Michael A. Joseph, 3930 Fuqa, Houston, Tex. 77034

[21] Appl. No.: 85,839

[22] Filed: Jul. 6, 1993

[51] Int. Cl.$^6$ .............................. F04B 1/94; A62C 37/10
[52] U.S. Cl. ................... 52/168; 52/218; 169/57; 169/61
[58] Field of Search .................... 52/168, 218, 219; 169/43, 46, 47, 54, 56, 57, 42, 60, 61; 239/208; 126/31, 35

[56] References Cited

U.S. PATENT DOCUMENTS

| | | | |
|---|---|---|---|
| 313,441 | 3/1885 | Nativel | 52/219 |
| 745,915 | 12/1903 | Scully | 169/54 |
| 859,616 | 7/1907 | Repetto | 52/218 |
| 1,484,328 | 2/1924 | Heimbach | 52/218 |
| 2,024,316 | 12/1935 | Theissing | 169/54 |
| 2,037,007 | 4/1936 | Conahey, Jr. | 52/219 |
| 2,297,808 | 10/1942 | Soucy | 169/54 |
| 2,634,720 | 4/1953 | Thulman | 52/219 |
| 3,160,087 | 12/1964 | Davidson | 52/219 |
| 3,584,688 | 6/1971 | Duncan | 169/47 |
| 3,616,583 | 11/1971 | Weineck et al. | 52/168 |
| 3,797,181 | 3/1974 | Nievelt | 52/219 |
| 4,872,513 | 10/1989 | Gardner et al. | 169/57 |
| 4,997,046 | 3/1991 | Evans, III | 169/54 |

FOREIGN PATENT DOCUMENTS

| | | | |
|---|---|---|---|
| 664022 | 9/1965 | Belgium | 52/218 |

*Primary Examiner*—Michael Safavi

[57] ABSTRACT

A duct system contains a narrow, liquid tight conduit filled with cold water which can be used to prevent fires in the ducts of chimneys, high rise buildings, restaurants and the like. If a fire starts in a duct, the wall of the duct heats up very slowly because of its proximity to the thin walled conduit containing the cold water (which gets warmer as the fire builds momentum). If the fire persists and the heat of the outer wall rises to a designated temperature (e.g. 200 degrees Fahrenheit), a valve opens and the heated water (the originally cold water) is flushed out and fresh cold water is brought in, further impeding the fire's progress. The fire will likely burn itself out without ever igniting any combustibles outside the duct walls. The flushed out water can be sprayed onto the roof of the building to prevent any burning fly ash from starting a fire on the roof.

10 Claims, 4 Drawing Sheets

FIRE PREVENTING DUCT SYSTEM

BACKGROUND OF THE INVENTION

1. Field of the Invention

The present invention relates generally to duct systems for removing smoke and the like, and more particularly, to a duct system especially adapted to prevent fires from starting from or advancing past the duct system.

2. Description of the Prior Art

Duct systems for the removal of smoke and the like in the form of chimneys and other types of vents are well known in the art of duct systems.

Thus, while the foregoing body of prior art indicates it to be well known to use duct systems to allow smoke and other gases to be removed from a source such as a fireplace of stove, the provision of a simple and cost effective device which can prevent the spread of a fire started inside the duct is not contemplated. Nor does the prior art described above teach or suggest a fire preventing duct system which may be used by individuals in many different types of situations to remove smoke and the like from a source such as a cooking device or a fireplace or the like. The foregoing disadvantages are overcome by the unique fire preventing duct system of the present invention as will be made apparent from the following description thereof. Other advantages of the present invention over the prior art also will be rendered evident.

SUMMARY OF THE INVENTION

To achieve the foregoing and other advantages, the present invention, briefly described, provides a duct system containing a narrow, liquid tight conduit filled with cold water. The duct system can be used to prevent fires in the ducts of chimneys, high rise buildings, restaurants and the like. If a fire starts in a duct, the wall of the duct heats up very slowly because of its proximity to the thin walled conduit containing the cold water (which gets warmer as the fire builds momentum). If the fire persists and the heat of the outer wall rises to a designated temperature (e.g. 200 degrees Fahrenheit), a valve opens and the heated water (the originally cold water) is flushed out and fresh cold water is brought in, further impeding the fire's progress. The fire will likely burn itself out without ever igniting any combustibles outside the duct walls. The flushed out water can be sprayed onto the roof of the building to prevent any burning fly ash from starting a fire on the roof.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new fire preventing duct system which has all of the advantages of the prior art and none of the disadvantages.

It is another object of the present invention to provide a new fire preventing duct system which may be easily and efficiently manufactured and marketed.

It is a further objective of the present invention to provide a new fire preventing duct system which is of durable and reliable construction.

An even further object of the present invention is to provide a new fire preventing duct system which is susceptible of a low cost of manufacture with regard to both materials and labor, and which accordingly is then susceptible of low prices of sale to the consuming public, thereby making such fire preventing duct system available to the buying public.

Still yet a further object of the present invention is to provide a new fire preventing duct system containing a narrow, liquid tight conduit filled with cold water which can be used to prevent fires in the ducts of chimneys, high rise buildings, restaurants and the like.

It is still a farther object of the present invention to provide a new fire preventing duct system which, if a fire starts in a duct, the wall of the duct heats up very slowly because of its proximity to a thin walled conduit containing cold water (which gets warmer as the fire builds momentum), keeping the fire's temperature from rising as fast as it would otherwise.

Still a further object of the present invention is to provide a new fire preventing duct system including means for opening a valve to a cold water source to replace the heated up water in the duct system if the fire persists and the heat of the outer wall rises to a designated temperature (e.g. 200 degrees Fahrenheit).

Still even a further object of the present invention is to provide a means for flushing out the heated water and spraying it onto the roof of the building to prevent any burning fly ash from starting a fire on the roof.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a fire preventing duct system embodying the principles and concepts of the present invention will be described.

Figures 3, 4:
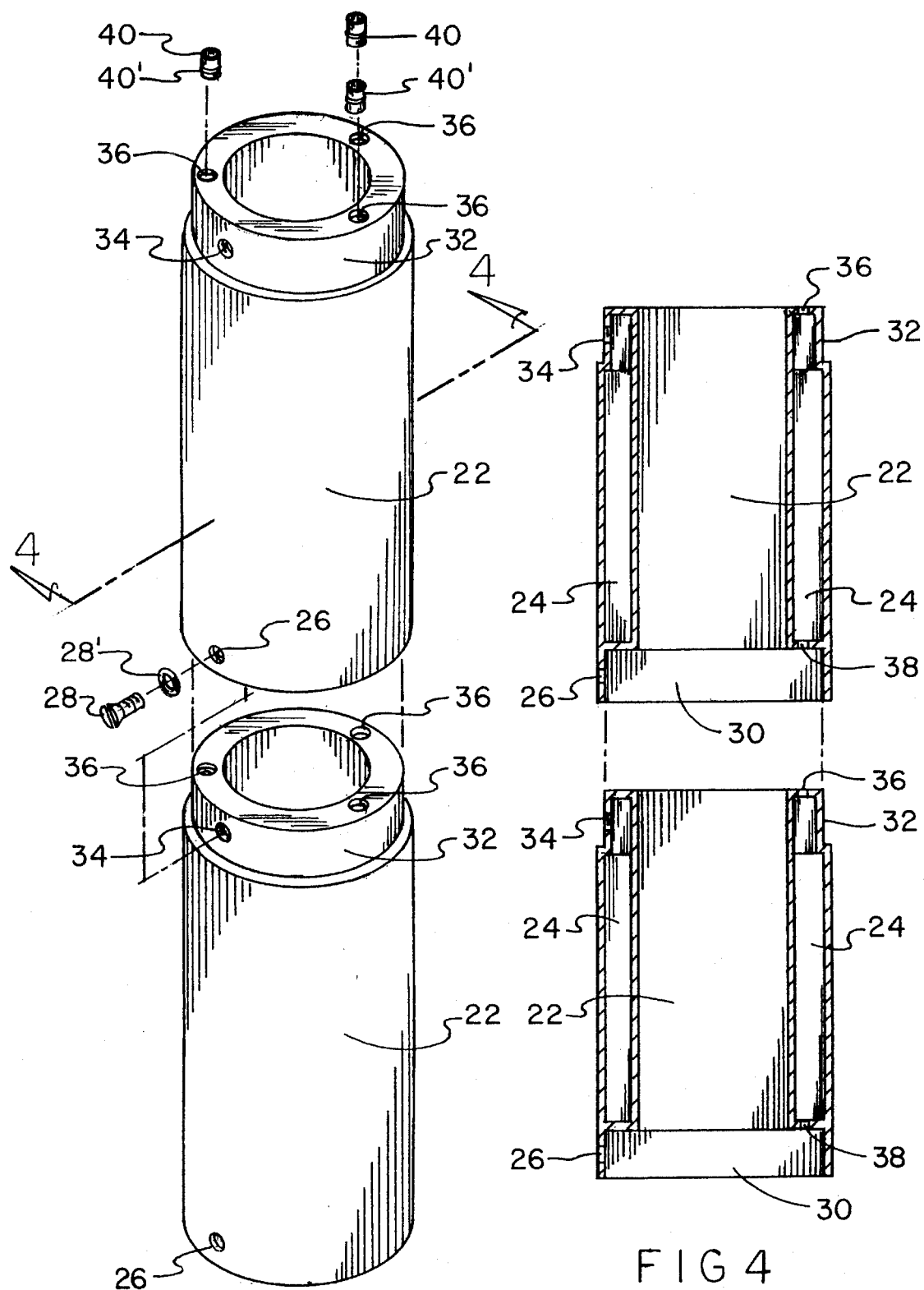
FIG. 3 is an elevational perspective view of part of the fire preventing duct system shown separated into its parts in accordance with the present invention.
FIG. 4 is a cross-sectional side view of the fire preventing duct system of FIG. 3 taken along line 4—4 thereof.
Figures 5, 6:
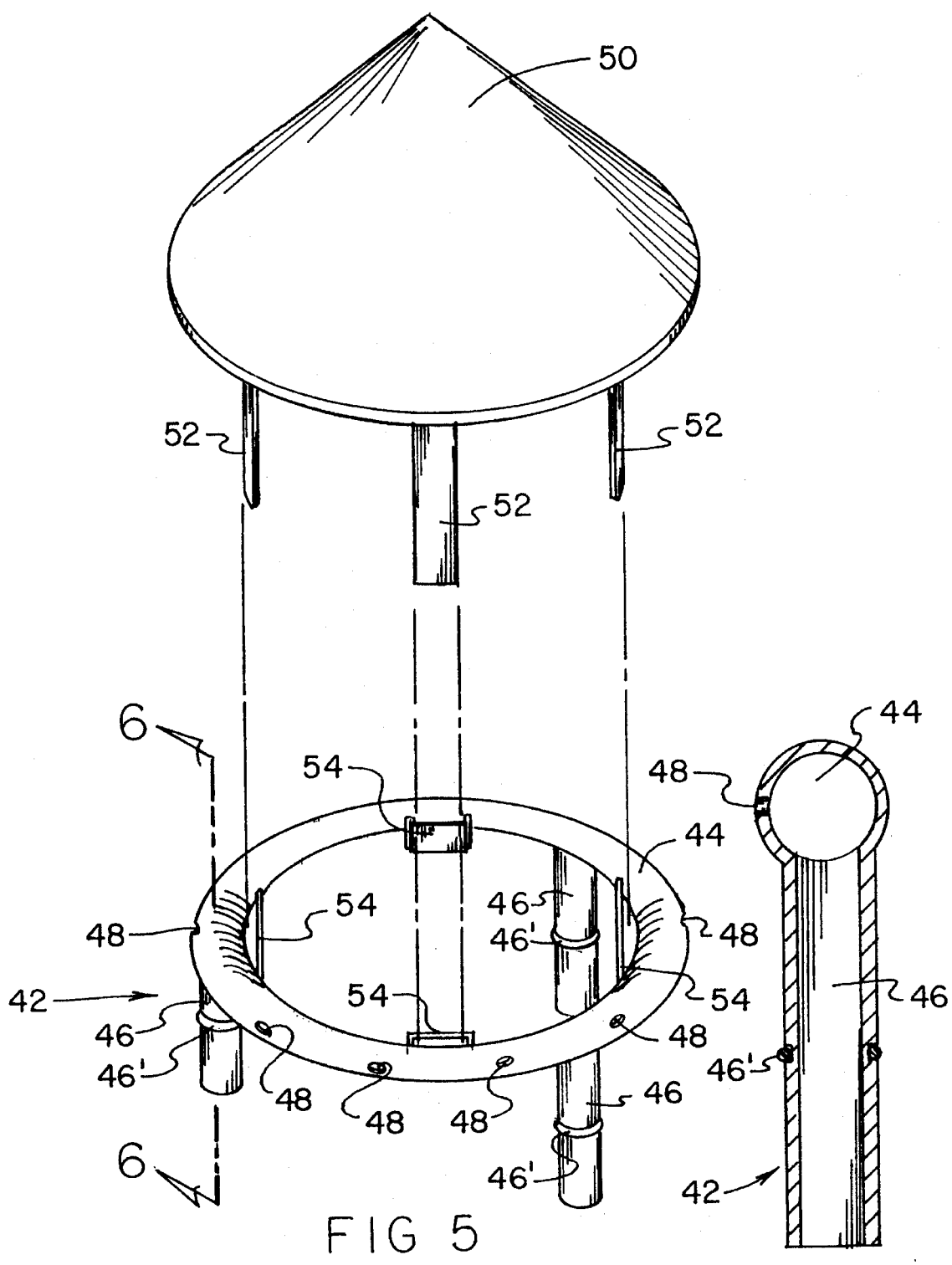
FIG. 5 is a perspective view in elevation of another part of the preferred embodiment of the present invention.
FIG. 6 is a partial cross-sectional side view preferred embodiment of the invention taken along 6—6 of FIG. 5.

Turning initially to FIGS. 1–6, and particularly FIGS. 3 and 5, there is shown an exemplary embodiment of the fire preventing duct system of the present invention.

Figures 1, 2:
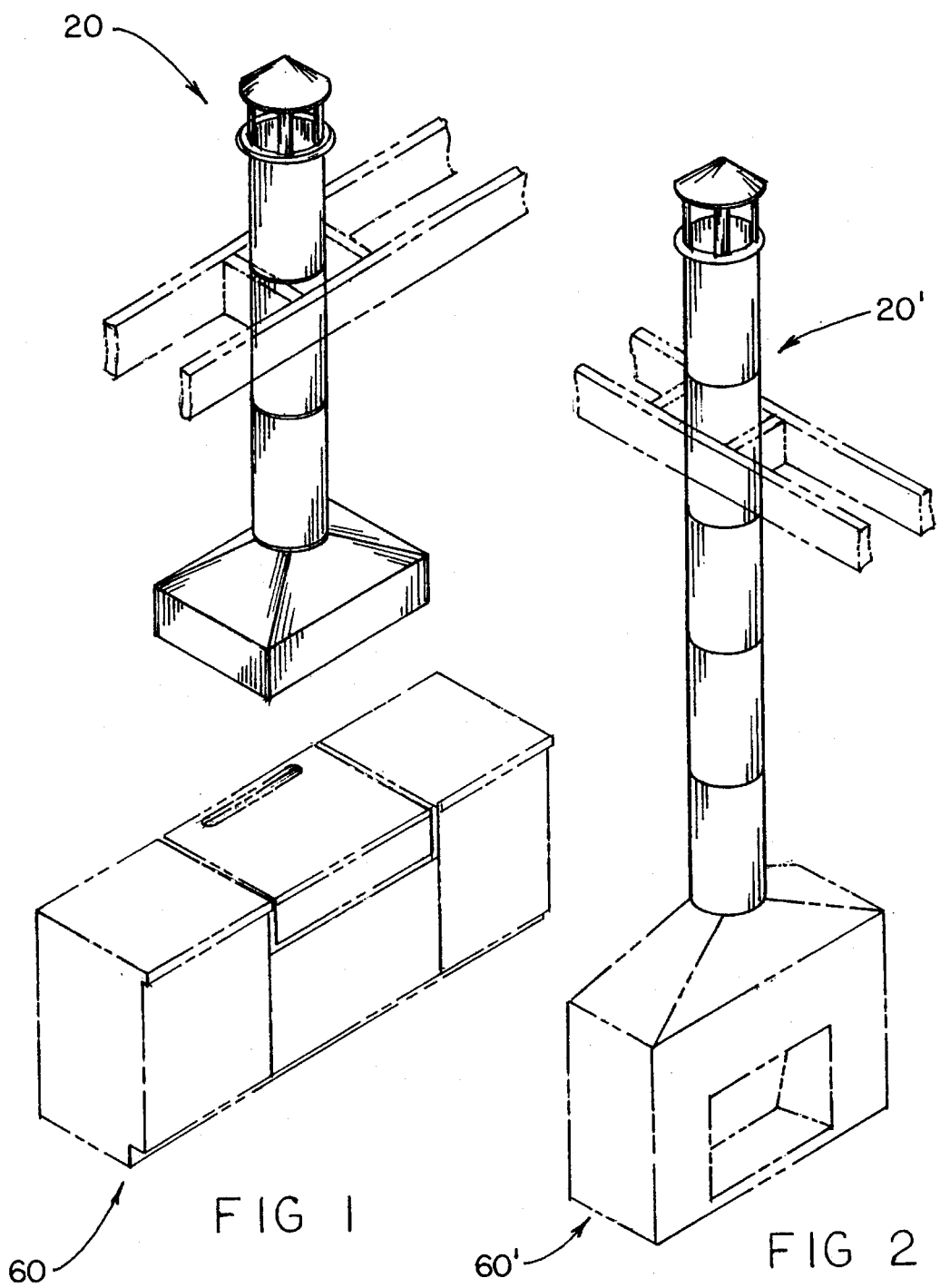
FIG. 1 is a perspective view showing the first preferred embodiment of the fire preventing duct system of the invention being used with a typical commercial grill hood.
FIG. 2 is a perspective view showing the first preferred embodiment of the fire preventing duct system of the invention being used with a typical residential fireplace.

A fire preventing duct system, represented by reference numeral 20, is shown for use over a commercial restaurant type grill 60 in FIG. 1. A fire preventing duct system, represented by reference numeral 20', is shown for use on a residential fireplace 60' in FIG. 2.

In its preferred form, the fire preventing duct system of the present invention comprises generally a series of duct sections 22 specially adapted to contain cold water in a thin wall passage 24. More specifically, each of the duct sections 22 includes an unlabeled interior cylindrical wall and an unlabeled exterior cylindrical wall concentrically positioned about the interior cylindrical wall. An upper annular wall (not labeled) extends between upper annular edges of the cylindrical walls, and an unlabeled lower annular wall extends between the interior and exterior cylindrical walls. By this structure, the upper annular wall cooperates with the lower annular wall and the cylindrical walls to define a thin wall passage extending concentrically about the interior cylindrical wall within which fluid can reside.

The duct sections 22 are shown in detail in FIGS. 3 and 4. The duct sections are constructed to partially nest so that they can be stacked to a desired height, with different heights possible for different situations. Each duct section 22 has a series of water exit and water entrance holes. On the outside bottom of each duct section 22 is bottom hole 26 for hooking up to a water source (not shown in Figures). Only the hole 26 for the bottom section 22 is used to attach to the water source if a plurality of sections 22 are used. The other holes 26 for the other sections 22 above the lowest section 22 are used to attach each higher section 22 to the next lowest section 22. In FIGS. 3 and 4 the top section 22 has its bottom hole 26 plugged by a screw 28 which is sealed by O-ring seal 28' to prevent leakage around the screw 28. The screw goes through both hole 26 and a correspondingly aligned hole 34 in the lower section 22.

Each section 22 has a wide lower area 30 and a narrow top area 32 enabling is what enables several sections 22 to be stacked safely together by nesting the narrow top area 32 of a first section 22 within the wide lower area 30 of a section 22 positioned above the first section 22.

Each section 22 has holes 36 in the top of narrow top area 32 and corresponding holes 38 (see FIG. 4) near the bottom of section 22. The top holes 36 of a first section 22 and the corresponding bottom holes 38 of a stacked second section are linked by feed through couplers 40 which have O-ring seals 40'.

Turning now to FIGS. 5 and 6, a spray ring assembly 42 and an optional hood 50 for use as part of the present invention are shown. The spray ring assembly 42 is comprised of ring 44 and legs 46, each leg having an O-ring seal 46'. The ring 44 has spray holes 48 for discharging water contained within the thin wall of the duct. Each leg is adapted to fit inside one of the holes 36 of the top section 22, with the seal 46' keeping a water tight fit.

Optional hood 50 can be used to help prevent grease and the like from flying out of the duct system. The hood can be mounted by snap in legs 52 into the mounting brackets 54 on the ring 42.

Figure 7:
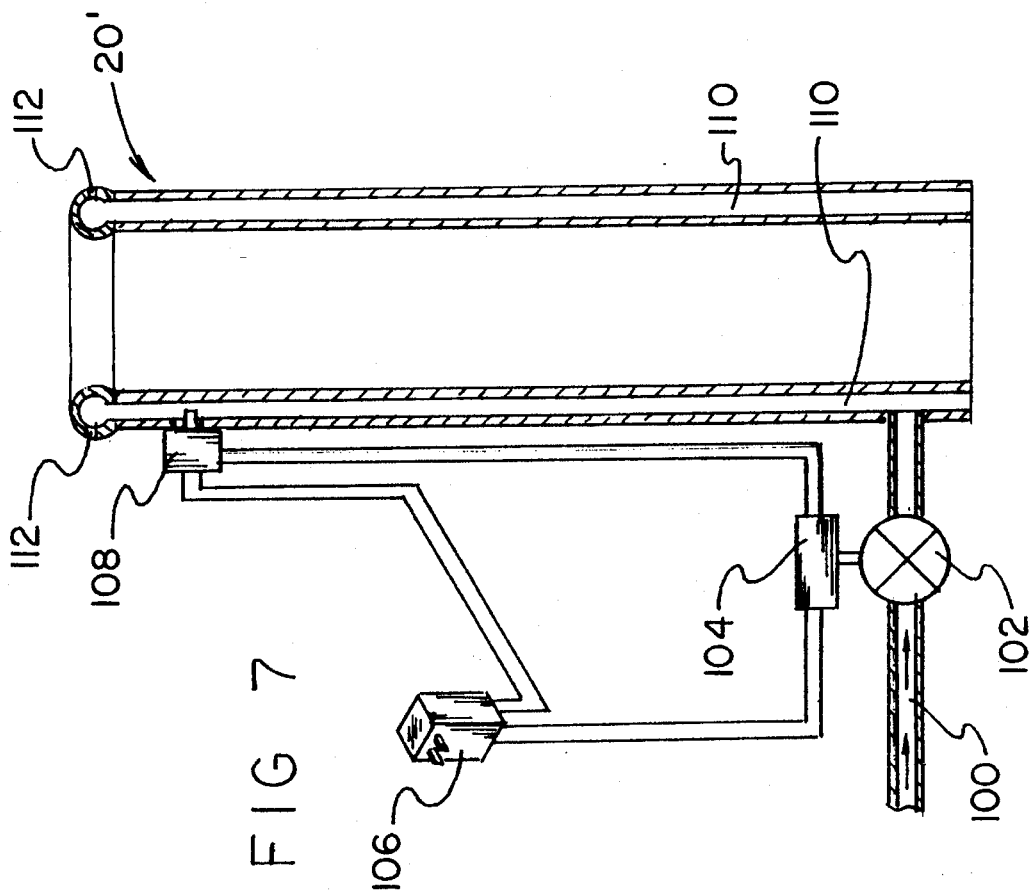
FIG. 7 is a partially cross-sectional side view of the fire preventing duct system of the present invention for use in a residential location.

FIG. 7 shows an embodiment of the present invention set up for use with a residential fireplace. Cold water 100 from a water source is prevented by valve 102 from entering the cold water containing thin walls 110 (which have been previously filled with water) of duct system 100. A communication system between solenoid 104 and temperature sensor 108 is powered by standard wall socket (represented in FIG. 7 by power plug 106 [115 V XFMR]).

The system works by temperature sensor 108 measuring the temperature of the water inside the thin walls 110. Usually the water will be relatively cold (or very cold if a refrigeration means is added to the system) inside the thin walls 110. However, if a fire has started or is starting inside the duct system, the water will slowly become heated as the power of the fire increases (having the water in the thin walls prevents the fire from strengthening as quickly as it would in a regular duct system). When the temperature of the water reaches a set temperature, the temperature sensor 108 will signal the solenoid 104 to open the valve 102, letting the cold water flow through the duct system farther reducing the ability of the fire to increase its strength. The heated water is forced out of the top of the duct system through exit spray holes 112 onto the roof where it wets down the roof to prevent any burning fly ash (or the like) from starting a fire on the roof. In most cases, using the duct system of the present invention, the fire will burn itself out. In other more serious cases, the duct system of the present invention will delay the spread of the fire so that when firefighters arrive, they will be able to stop the fire.

Figure 8:
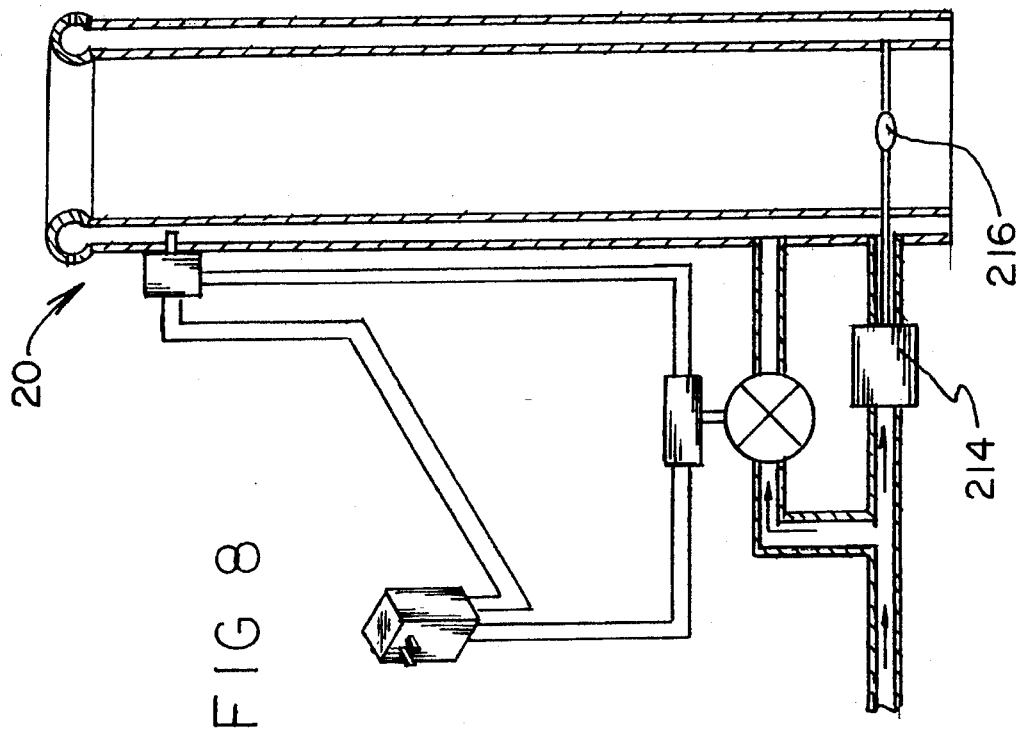
FIG. 8 is a partially cross-sectional side view of a second embodiment of a fire preventing duct system of the present invention for use in a commercial location.

FIG. 8 shows the setup for a commercial restaurant type of situation. Use of the system is the same as it is for the residential setup of FIG. 7, with the addition of a secondary activation means comprised of spring actuated valve 214 which opens when fuse link 216 is broken (by for example a fire inside the duct of 350 degrees Fahrenheit). This provides added insurance that the system will send fresh water into the thin walls in case of a fire.

It is apparent from the above that the present invention accomplishes all of the objectives set forth by providing a new fire preventing duct system comprising: at least one duct pipe having a hollow wall adapted to hold a liquid; whereby if a fire should start within the duct pipe, having the liquid in the duct pipe will slow down any rise in the temperature of the fire. The at least one duct pipe can be a series of duct pipes which are adapted to connect together and in which the hollow walls are in liquid communication. The liquid used is preferably regular tap water and the system can be connected to a water source. The system can further comprise a means for spraying water heated by a fire onto the roof of the installation site and also can further comprise a means for replacing the water sprayed out by the means for spraying with colder water. The series of duct pipes can be narrow, liquid tight conduits filled with cold water. The system can be used in residential chimneys and in commercial restaurants as well as in numerous other locations. The invention can further comprise a means for sensing the temperature of the water contained within the thin walls and can further comprise a means for opening a water source valve if the water within the walls reaches too hot a temperature. The invention can further comprise a fuse link means for opening a spring actuated valve when the temperature within the duct becomes too high.

With respect to the above description, it should be realized that the optimum dimensional relationships for the parts of the invention, to include variations in size, materials, shape, form, function and manner operation, assembly and use, are deemed readily apparent and obvious to those skilled in the art, and therefore, all relationships equivalent to those illustrated in the drawings, and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A fire preventing duct system comprising:

first and second duct sections, each of the duct sections including an interior cylindrical wall having a first diameter; an exterior cylindrical wall having a second diameter, wherein the second diameter is substantially greater that the first diameter, the exterior cylindrical wall being concentrically positioned about the interior cylindrical wall; an upper annular wall extending between upper annular edges of the cylindrical walls; and a lower annular wall extending between the interior and exterior cylindrical walls, the upper annular wall cooperating with the lower annular wall and the cylindrical walls to define a thin wall passage extending concentrically about the interior cylindrical wall;

coupling means for coupling the first duct section to the second duct section such that the thin wall passage of the first duct section is positioned in fluid communication with the thin wall passage of the second duct section;

wherein the exterior cylindrical wall of each of the duct sections is shaped so as to define a wide lower area extending along a lower annular edge thereof, and a narrow top area extending along the upper annular edge thereof, wherein the narrow top area of the second duct section can be positioned within the wide lower area of the first duct section;

wherein each of the duct sections includes a plurality of upper holes directed through the upper annular wall, and further wherein each of the duct sections includes a plurality of lower holes directed through the lower annular wall for permitting fluid communication between the thin wall passage of the first duct section and the thin wall passage of the second duct section;

wherein the coupling means comprises a plurality of feed through couplers positioned so as to extend within the upper holes of the second duct section and the lower holes of the first duct section;

and further comprising a spray ring assembly coupled to the upper annular wall of the first duct section, the spray ring comprising an annular ring having a hollow interior, a plurality of tubular legs extending from the annular ring and terminating in lower distal ends, the tubular legs each being in fluid communication with the hollow interior of the annular ring, with the lower distal ends of each of the tubular legs extending through an individual one of the upper holes of the first duct section, the annular ring including a plurality of spray holes directed therethrough such that fluid within the thin wall passage of the first duct section can be expelled through the spray holes.

2. The new fire preventing duct system of claim 1, wherein the spray holes are oriented to extend substantially orthogonally relative to a longitudinal axis directed through a center of the first duct section and parallel to the interior cylindrical wall thereof.

3. The new fire preventing duct system of claim 2, wherein the spray holes are directed so as to project radially outward from the longitudinal axis directed through a center of the first duct section.

4. The new fire preventing duct system of claim 3, and further comprising a hood coupled to the annular ring.

5. The new fire preventing duct system of claim 4, and further comprising a plurality of snap in legs coupled to and extending from the hood; and a plurality of mounting brackets secured to the annular ring, wherein the snap in legs are engaged to the mounting brackets to couple the hood to the annular ring.

6. The new fire preventing duct system of claim 5, and further comprising a sensing means for supplying water from a water source into the thin wall passage of the duct sections in response to an elevated temperature within the duct sections.

7. The new fire preventing duct system of claim 6, wherein the sensing means comprises a water duct system means connectable to a water source for supplying water from the water source to the thin wall passage of at least one of the duct sections; a valve means positioned in the water duct system for controlling a flow of water therethrough; a solenoid means electrically coupled to the valve; and a temperature sensor means in electrical communication with the solenoid for selectively actuating the solenoid to open the valve in response to an elevated temperature of water within the thin wall passage of at least one of the duct sections.

8. The new fire preventing duct system of claim 7, wherein the sensing means further comprises a secondary activation means for sensing fire within at least one of the duct sections, the secondary activation means comprising a spring actuated valve in fluid communication with the water duct system means and one of the duct sections; a fuse link extending across an interior volume of the interior cylindrical wall of one of the duct sections, the fuse link being frangible in response to a predetermined level of heat within one of the duct sections, the fuse link being coupled to the spring actuated valve so as to actuate the spring actuated valve in response to a fracturing of the fuse link to permit water from the water duct system means to flow into the thin wall passage of one of the duct sections.

9. A fire preventing duct system comprising:

first and second duct sections, each of the duct sections including an interior cylindrical wall having a first diameter; an exterior cylindrical wall having a second diameter, wherein the second diameter is substantially greater that the first diameter, the exterior cylindrical wall being concentrically positioned about the interior cylindrical wall; an upper annular wall extending between upper annular edges of the cylindrical walls; and a lower annular wall extending between the interior and exterior cylindrical walls, the upper annular wall cooperating with the lower annular wall and the cylindrical walls to define a thin wall passage extending concentrically about the interior cylindrical wall;

coupling means for coupling the first duct section to the second duct section such that the thin wall passage of the first duct section is positioned in fluid communication with the thin wall passage of the second duct section;

and further comprising a sensing means for supplying water from a water source into the thin wall passage of the duct sections in response to an elevated temperature within the duct sections, wherein the sensing means comprises a water duct system means connectable to a water source for supplying water from the water source to the thin wall passage of at least one of the duct sections; a valve means positioned in the water duct system for controlling a flow of water therethrough; a solenoid means electrically coupled to the valve; and a temperature sensor means in electrical communication with the solenoid for selectively actuating the solenoid to open the valve in response to an elevated temperature of water within the thin wall passage of at least one of the duct sections.

10. The new fire preventing duct system of claim 9, wherein the sensing means further comprises a secondary activation means for sensing fire within at least one of the duct sections, the secondary activation means comprising a spring actuated valve in fluid communication with the water duct system means and one of the duct sections; a fuse link extending across an interior volume of the interior cylindrical wall of one of the duct sections, the fuse link being frangible in response to a predetermined level of heat within one of the duct sections, the fuse link being coupled to the spring actuated valve so as to actuate the spring actuated valve in response to a fracturing of the fuse link to permit water from the water duct system means to flow into the thin wall passage of one of the duct sections.

* * * * *